US012659298B2

(12) United States Patent
Jindal et al.

(10) Patent No.: US 12,659,298 B2
(45) Date of Patent: Jun. 16, 2026

(54) SYSTEM, METHOD, AND DATA DIODE FOR SELECTIVE UNIDIRECTIONAL DATA TRANSFER

(71) Applicants: Mohan Kumar Jindal, Bangalore (IN); Shailja Jindal, Bangalore (IN)

(72) Inventors: Mohan Kumar Jindal, Bangalore (IN); Srirama Chandra Murthy Pratapa, Bangalore (IN); Vidya Milind Kulkarni, Bangalore (IN); Pratiksha Balasaheb Pawar, Bangalore (IN); Dhileep Kumar Pailu, Bangalore (IN); Sreehari Kamsala, Bangalore (IN); Anju Varghese, Bangalore (IN); Hari Prasad Badham, Bangalore (IN); Ayush Rushat Venkata Aripirala, Bangalore (IN); Ujjwal Bajaj, Bangalore (IN); Sumit Manoj Kavathekar, Bangalore (IN); Akshay Purushottam Soni, Bangalore (IN); Jaspritam Singh, Bangalore (IN); Sanchith Vakkalaganti Mahesh, Bangalore (IN); Mayuri Uday Dawande, Bangalore (IN); Pratiksha Ishwar Jondhale, Bangalore (IN); Sahana M Kulkarni, Bangalore (IN); Ravi Patel, Bangalore (IN)

(73) Assignees: Mohan Kumar Jindal, Bangalore (IN); Shailja Jindal, Bangalore (IN)

( * ) Notice: Subject to any disclaimer, the term of this patent is extended or adjusted under 35 U.S.C. 154(b) by 84 days.

(21) Appl. No.: 18/652,835

(22) Filed: May 2, 2024

(65) Prior Publication Data

US 2024/0380733 A1     Nov. 14, 2024

Related U.S. Application Data

(63) Continuation-in-part of application No. PCT/IN2024/050107, filed on Feb. 3, 2024.

(51) Int. Cl.
H04L 29/06 (2006.01)
H04L 9/40 (2022.01)

(52) U.S. Cl.
CPC ...... H04L 63/0245 (2013.01); H04L 63/1425 (2013.01)

(58) Field of Classification Search
CPC ............. H04L 63/0245; H04L 63/1425; H04L 63/0227
See application file for complete search history.

(56) References Cited

U.S. PATENT DOCUMENTS

| | | | |
|---|---|---|---|
| 2011/0231564 A1* | 9/2011 | Korsunsky | .......... H04L 63/1483 709/231 |
| 2015/0163198 A1* | 6/2015 | Moore | .................. H04L 63/029 726/14 |

(Continued)

OTHER PUBLICATIONS

Sterneling, Hanna. "Monitoring of a Modelled Real-Time System: with Data Diode Enabled Unidirectional Network." (2020). (Year: 2020).*

*Primary Examiner* — Ka Shan Choy
(74) *Attorney, Agent, or Firm* — Jose Cherson Weissbrot

(57) ABSTRACT

Disclosed is a data diode configured to receive a user-defined set of values for a set of parameters from the user device, generate a filter logic based on the user-defined set of values, receive one or more data packets and a set of values for the set of parameters corresponding to each data packet of the one or more packets from the plurality of transmitter devices, segregate the one or more data packets into a set of valid data packets and a first set of invalid data packets, transmit the set of valid data packets to the plurality of receiver devices, and store the first set of invalid data packets with a first set of time-stamped invalidity logs the (Continued)

data diode enables unidirectional flow of the set of valid data packets from the plurality of transmitter devices to the plurality of receiver devices.

12 Claims, 3 Drawing Sheets

(56)                    References Cited

U.S. PATENT DOCUMENTS

2021/0149909 A1 *    5/2021   Diaz ..................... G06F 16/254
2021/0367972 A1 *   11/2021   Lee ....................... H04L 9/3215
2024/0406293 A1 *   12/2024   Evans ................... G06F 21/606
2025/0053468 A1 *    2/2025   West ...................... G06F 9/547

* cited by examiner

300

Start receiving, by way of a management port of a data diode, a user-defined set of values for a set of parameters from a user device.  — 302 generating, by way of a controller of the data diode, a filter logic based on the user-defined set of values for the set of parameters received from the user device.  — 304 receiving, by way of an anode port of the data diode, from a plurality of transmitter devices, one or more data packets and a first set of values for the set of parameters corresponding to each data packet of the one or more data packets.  — 306 comparing, by way of a comparator of the data diode, the first set of values for the set of parameters corresponding to each data packet of the one or more data packets with the user-defined set of values for the set of parameters.  — 308 segregating, by way of the comparator of the data diode, the one or more data packets into a set of valid data packets and a first set of invalid data packets.  — 310

Transmitting unidirectionally, by way of a cathode port of the data diode, the set of valid packets of the one or more data packets to a plurality of receiver devices.  — 312 generating, by way of a log generator of the data diode, a first set of time-stamped invalidity logs corresponding to the first set of invalid data packets based on the first set of values for the set of parameters corresponding to each data packet of the first set of invalid data packets.  — 314 storing, by way of a local database of the data diode, the first set of invalid data packets with a first set of time-stamped invalidity logs.  — 316 generating, by way of the controller of the data diode, a second set of invalid data packets that are received from the plurality of receiver devices.  — 318 generating, by way of the log generator, a second set of time-stamped invalidity logs for the second set of invalid data packets based on a second set of values for the set of parameters corresponding to each data packet of the second set of invalid data packets.  — 320 storing, by way of the local database, the second set of invalid data packets with the second set of time-stamped invalidity logs.  — 322

Stop

FIG. 3

SYSTEM, METHOD, AND DATA DIODE FOR SELECTIVE UNIDIRECTIONAL DATA TRANSFER

TECHNICAL FIELD

The present disclosure relates generally to secure data transfer. More particularly, the present disclosure relates to a system, a method, and a data diode for selective unidirectional data transfer.

BACKGROUND

Data communication is a need of the era, and so is the regulation of the data transfer. Conventionally, firewall systems are deployed to regulate the data transfer and filter traffic of the data communication. Firewall systems are usually deployed by way of a combined hardware software configuration and are not very safe in terms of data security. Most of the firewall systems are hackable and thus are prone to data theft, data loss and/or malicious data transfer.

Another category of data regulation devices is a data diode that enables a unidirectional transfer of data only. Unidirectional transfer of data is a common requirement in many organizations where a user does not expect any incoming data from the organization from the network-node, but only requires outgoing data to be sent to a specific node-point. This is useful in cases where highly confidential data must be transferred with high levels of security to avoid breaches or third-party interference. Data diodes are generally hardware deployed systems and comparatively more secure and reliable. However, the conventional data diodes may lack specific regulation of data between selected transmitter and receiver nodes.

Thus, a system, a method, and a device capable of secure data transfer between a selective set of nodes is an ongoing effort, and demands a need for improvised technical solution that overcomes the aforementioned problems.

SUMMARY

In an aspect of the present disclosure, a data diode includes a management port, a controller, an anode port, a comparator, a cathode port, and a local database. The data diode is configured to enable unidirectional flow of the set of valid data packets from the plurality of transmitter devices to the plurality of receiver devices. The management port is configured to receive a user-defined set of values for a set of parameters from the user device. The controller is coupled to the management port and configured to generate a filter logic based on the pre-defined set of values for the set of parameters received from the user device. The anode port is coupled to the plurality of transmitter devices and is configured to receive, from the plurality of transmitter devices, one or more data packets and a set of values for the set of parameters corresponding to each data packet of the one or more packets. The comparator is coupled to the controller and the anode port, and is configured to segregate the one or more data packets into a set of valid data packets and a first set of invalid data packets. The cathode port is coupled to the comparator and is configured to transmit the set of valid packets of the one or more data packets to the plurality of receiver devices. The local database is coupled to the comparator and the cathode port, and is configured to store the first set of invalid data packets with a first set of time-stamped invalidity logs. The data diode is configured for unidirectional flow of the set of valid data packets from the plurality of transmitter devices to the plurality of receiver devices.

In some aspects, prior to the segregation of the one or more data packets, the comparator is configured to compare the set of values for the set of parameters corresponding to the one or more data packets with the user-defined set of values for the set of parameters.

In some aspects, the controller is further configured to generate a second set of invalid data packets that are received from the plurality of receiver devices.

In some aspects, the data diode further includes a log generator that is coupled to the comparator. The log generator is configured to generate a first set of time-stamped invalidity logs corresponding to the first set of invalid data packets based on the set of values for the set of parameters corresponding to each data packet of the first set of invalid data packets. The log generator is further configured to generate a second set of time-stamped invalidity logs for the second set of invalid data packets based on a second set of values for the set of parameters corresponding to each data packet of the second set of invalid data packets.

In some other aspects of the present disclosure, a system includes a user device, a plurality of transmitter devices, a plurality of receiver devices, and a data diode. The data diode is coupled to the user device, the plurality of transmitter devices, and the plurality of receiver devices. The data diode is configured to enable unidirectional flow of the set of valid data packets from the plurality of transmitter devices to the plurality of receiver devices. The data diode includes a management port, a controller, an anode port, a comparator, a cathode port, and a local database. The management port is configured to receive a user-defined set of values for a set of parameters from the user device. The controller is coupled to the management port and configured to generate a filter logic based on the pre-defined set of values for the set of parameters received from the user device. The anode port is coupled to the plurality of transmitter devices and is configured to receive, from the plurality of transmitter devices, one or more data packets and a set of values for the set of parameters corresponding to each data packet of the one or more packets. The comparator is coupled to the controller and the anode port, and is configured to segregate the one or more data packets into a set of valid data packets and a first set of invalid data packets. The cathode port is coupled to the comparator and is configured to transmit the set of valid packets of the one or more data packets to the plurality of receiver devices. The local database is coupled to the comparator and the cathode port, and is configured to store the first set of invalid data packets with a first set of time-stamped invalidity logs.

In some other aspects of the present disclosure, a method includes receiving, by way of a management port of a data diode, a user-defined set of values for a set of parameters from a user device. The method further includes generating, by way of a controller of the data diode, a filter logic based on the user-defined set of values for the set of parameters received from a user device. Furthermore, the method includes receiving, by way of an anode port of the data diode, from a plurality of transmitter devices, one or more data packets and a first set of values for the set of parameters corresponding to each data packet of the one or more data packets. Furthermore, the method includes segregating, by way of a comparator of the data diode, the one or more data packets into a set of valid data packets and a first set of invalid data packets. Furthermore, the method includes transmitting, by way of a cathode port of the data diode, the set of valid packets of the one or more data packets to a plurality of receiver devices. Furthermore, the method includes storing, by way of a local database of the data diode, the first set of invalid data packets with a first set of time-stamped invalidity logs.

BRIEF DESCRIPTION OF DRAWINGS

The above and still further features and advantages of aspects of the present disclosure becomes apparent upon consideration of the following detailed description of aspects thereof, especially when taken in conjunction with the accompanying drawings, and wherein:

FIG. 3 illustrates a flow chart of a method for the selective unidirectional data transfer, in accordance with an exemplary aspect of the present disclosure.

To facilitate understanding, like reference numerals have been used, where possible, to designate like elements common to the figures.

DETAILED DESCRIPTION

Figure 1:
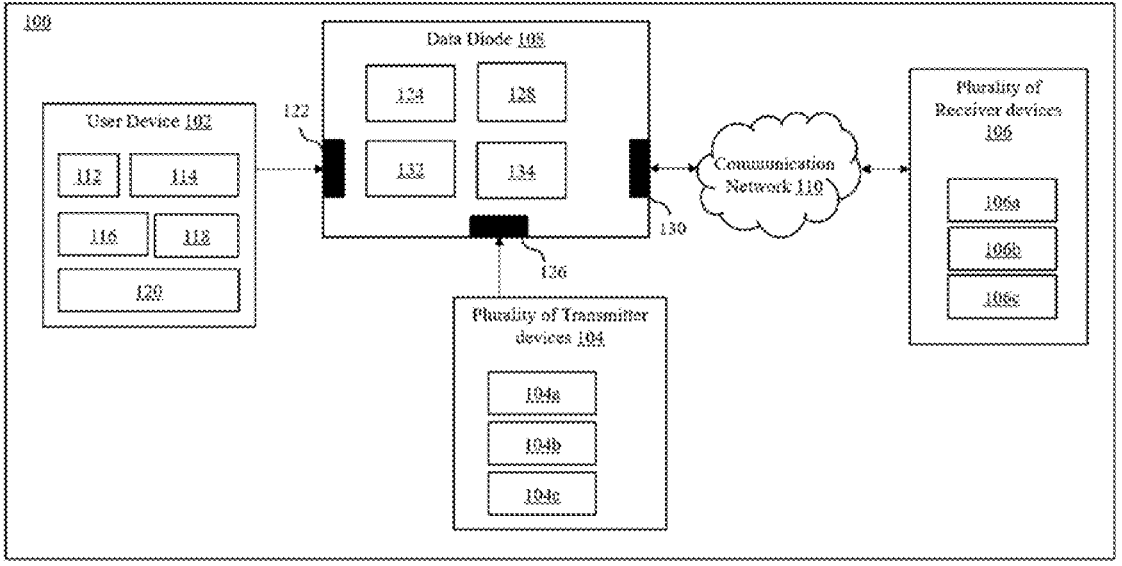
FIG. 1 illustrates a block diagram of a system for selective unidirectional data transfer, in accordance with an exemplary aspect of the present disclosure.

Various aspect of the present disclosure provides a system, a method, and a data diode for unidirectional data transfer. The following description provides specific details of certain aspects of the disclosure illustrated in the drawings to provide a thorough understanding of those aspects. It should be recognized, however, that the present disclosure can be reflected in additional aspects and the disclosure may be practiced without some of the details in the following description.

The various aspects including the example aspects are now described more fully with reference to the accompanying drawings, in which the various aspects of the disclosure are shown. The disclosure may, however, be embodied in different forms and should not be construed as limited to the aspects set forth herein. Rather, these aspects are provided so that this disclosure is thorough and complete, and fully conveys the scope of the disclosure to those skilled in the art. In the drawings, the sizes of components may be exaggerated for clarity.

It is understood that when an element or layer is referred to as being "on," "connected to," or "coupled to" another element or layer, it can be directly on, connected to, or coupled to the other element or layer or intervening elements or layers that may be present. As used herein, the term "and/or" includes any and all combinations of one or more of the associated listed items.

The subject matter of example aspects, as disclosed herein, is described with specificity to meet statutory requirements. However, the description itself is not intended to limit the scope of this patent. Rather, the inventor/inventors have contemplated that the claimed subject matter might also be embodied in other ways, to include different features or combinations of features similar to the ones described in this document, in conjunction with other technologies. Generally, the various aspects including the example aspects relate to the system, and the method for the transportation of the load. As mentioned, there remains a need for a system, a method, and a device capable of secure data transfer between a selective set of nodes. The present aspect, therefore: provides a system, a method, and a data diode capable of secure data transfer between a selective set of nodes or devices (i.e., selective and secure unidirectional data transfer).

The aspects herein and the various features and advantageous details thereof are explained more fully with reference to the non-limiting aspects that are illustrated in the accompanying drawings and detailed in the following description. Descriptions of well-known components and processing techniques are omitted so as to not unnecessarily obscure the aspects herein. The examples used herein are intended merely to facilitate an understanding of ways in which the aspects herein may be practiced and to further enable those of skill in the art to practice the aspects herein. Accordingly, the examples should not be construed as limiting the scope of the aspects herein.

FIG. 1 illustrates a block diagram of a system 100 for selective unidirectional data transfer, in accordance with an exemplary aspect of the present disclosure.

The system 100 may include a user device 102, a plurality of transmitter devices 104, a plurality of receiver devices 106, and a data diode 108. The data diode 108 may be communicatively coupled to the user device 102, the plurality of transmitter devices 104, and the plurality of receiver devices 106. In some aspects of the present disclosure, the data diode 108 may be coupled to the user device 102 by way of either of, a first wired communication medium and a first wireless communication medium. The data diode 108 may further be coupled to the plurality of transmitter devices 104 by way of either of, a second wired communication medium and a second wireless communication medium. In some other aspects of the present disclosure, the data diode 108 may be coupled to the user device 102 and the plurality of transmitter devices 104 by way of a single wireless medium (not shown). The data diode 108 may further be coupled to the plurality of receiver devices 106 by way of a communication network 110.

The user device 102 may be configured to facilitate a user to input a user-defined set of values for a set of parameters. The set of parameters may include but are not limited to one or more attributes and/or one or more specifications and/or one or more properties, corresponding to the plurality of transmitter devices 104. Aspects of the present disclosure are intended to include and/or otherwise cover any type of the parameters of the set of parameters including known and/or related to later developed technologies. The user device 102 may further be configured to facilitate the user to register on the system 100 for the selective unidirectional data transfer between one or more transmitter devices of the plurality of transmitter devices 104 and one or more receiver devices of the plurality of receiver devices 106. Furthermore, the user device 102 may facilitate the user to enable a password protection for logging in (or authentication of the user) in the system 100.

In an exemplary aspect of the present disclosure, the user device 102 may include a user interface 112, a processing unit 114, a device memory 116, a management console 118, and a communication interface 120. The user interface 112 may include an input interface for receiving inputs from the user. Examples of the input interface may include, but are not limited to, a touch interface, a mouse, a keyboard, a motion recognition unit, a gesture recognition unit, a voice recognition unit, or the like. Aspects of the present disclosure are intended to include or otherwise cover any type of the input interface including known, related art, and/or later developed technologies. The user interface 112 may further include an output interface for displaying (or presenting) an output to the user. Examples of the output interface may include, but are not limited to, a digital display, an analog display, a touch screen display, a graphical user interface, a website, a webpage, a keyboard, a mouse, a light pen, an appearance of a desktop, and/or illuminated characters. Aspects of the present disclosure are intended to include and/or otherwise cover any type of the output interface including known and/or related, or later developed technologies.

The processing unit 114 may include suitable logic, instructions, circuitry, interfaces, and/or codes for executing various operations, such as the operations associated with the user device 102, or the like. In some aspects of the present disclosure, the processing unit 114 may utilize one or more processors such as Arduino or raspberry pi or the like. Further, the processing unit 114 may be configured to control one or more operations executed by the user device 102 in response to the input received at the user interface 112 from the user. Examples of the processing unit 114 may include, but are not limited to, an application-specific integrated circuit (ASIC) processor, a reduced instruction set computing (RISC) processor, a complex instruction set computing (CISC) processor, a field-programmable gate array (FPGA), a Programmable Logic Control unit (PLC), and the like. Aspects of the present disclosure are intended to include or otherwise cover any type of processing unit including known, related art, and/or later developed processing units.

The device memory 116 may be configured to store the logic, instructions, circuitry, interfaces, and/or codes of the processing unit 114, data associated with the user device 102, and/or data associated with the system 100. Examples of the device memory 116 may include, but are not limited to, a Read-Only Memory (ROM), a Random-Access Memory (RAM), a flash memory, a removable storage drive, a hard disk drive (HDD), a solid-state memory, a magnetic storage drive, a Programmable Read Only Memory (PROM), an Erasable PROM (EPROM), and/or an Electrically EPROM (EEPROM). Aspects of the present disclosure are intended to include or otherwise cover any type of device memory including known, related art, and/or later developed memories.

The management console 118 may be configured as a computer-executable application, to be executed by the processing unit 114. The management console 118 may include suitable logic, instructions, and/or codes for executing various operations and may be controlled by the data diode 108. The one or more computer executable applications may be stored in the device memory 116. Examples of the one or more computer executable applications may include, but are not limited to, an audio application, a video application, a social media application, a navigation application, or the like. Aspects of the present disclosure are intended to include or otherwise cover any type of the computer executable application including known, related art, and/or later developed computer executable applications.

The communication interface 120 may be configured to enable the user device 102 to communicate with the data diode 108. Examples of the communication interface 120 may include, but are not limited to, a modem, a network interface such as an Ethernet card, a communication port, and/or a Personal Computer Memory Card International Association (PCMCIA) slot and card, an antenna, a radio frequency (RF) transceiver, one or more amplifiers, a tuner, one or more oscillators, a digital signal processor, a coder-decoder (CODEC) chipset, a subscriber identity module (SIM) card, and a local buffer circuit. It will be apparent to a person of ordinary skill in the art that the communication interface 120 may include any device and/or apparatus capable of providing wireless or wired communications between the user device 102 and the data diode 108.

The plurality of transmitter devices 104 may be configured to generate one or more data packets. The plurality of transmitter devices 104 may be configured to transmit the one or more data packets to the data diode 108. The plurality of transmitter devices 104 is shown to have first through third transmitter devices of the plurality of transmitter devices 104, shown as 104a-104c, respectively, to make the illustration concise and clear. However, it will be apparent to a person skilled in the art that the plurality of transmitter devices 104 can have any number of transmitter devices, without deviating from the scope of the present disclosure, and thus should not be considered as a limitation of the present disclosure. In such a scenario, each transmitter device of the plurality of transmitter devices 104 is adapted to perform one or more functionalities in a manner similar to the functionalities of the plurality of transmitter devices 104.

The plurality of receiver devices 106 may be configured to receive one or more data packets of a set of valid data packets from the data diode 108. The plurality of receiver devices 106 is shown to have first through third transmitter devices of the plurality of receiver devices 106, shown as 106a-106c, respectively, to make the illustration concise and clear. However, it will be apparent to a person skilled in the art that the plurality of receiver devices 106 can have any number of transmitter devices, without deviating from the scope of the present disclosure, and thus should not be considered as a limitation of the present disclosure. In such a scenario, each receiver device of the plurality of receiver devices 106 is adapted to perform one or more functionalities in a manner similar to the functionalities of the plurality of receiver devices 106.

The data diode 108 may be configured to enable transmission of the set of valid data packets from the plurality of transmitter devices 104 to the plurality of receiver devices 106. The data diode 108 may include a management port 122, a controller 124, an anode port 126, a comparator 128, a cathode port 130, a local data base 132, and a log generator 134. In some aspects of the present disclosure, the data diode 108 may be implemented on at least one of, a Field Programmable Gate Array (FPGA) and Application Specific Integrated Circuits (ASICs). In some other aspects of the present disclosure, one or more components of the data diode 108 (i.e., the management port 122, the controller 124, the anode port 126, the comparator 128, the cathode port 130, the local data base 132, and the log generator 134) may be implemented on at least one of, a Field Programmable Gate Array (FPGA) and Application Specific Integrated Circuits (ASICs).

The management port 122 may be configured to receive the user-defined set of values for the set of parameters from the user device 102. In some aspects of the present disclosure, the management port 122 may be configured to receive the user-defined set of values for the set of parameters from the user device 102 via the first wired communication medium. Preferably, the management port 122 may be configured as a Registered Jack (RJ) port, and may be configured to receive the user-defined set of values for the set of parameters from the user device 102 via a Registered Jack-45 (RJ-45) cable. In other aspects of the present disclosure, the management port 122 may be configured to receive the user-defined set of values for the set of parameters from the user device 102 via the first wireless medium. In some aspects of the present disclosure, the management port 122 may be implemented on at least one of, a Field Programmable Gate Array (FPGA) and Application Specific Integrated Circuits (ASICs).

The controller 124 may include suitable logic, instructions, circuitry, interfaces, and/or codes for executing various operations of the system 100. The controller 124 may be configured to host and enable the management console 118 running on (or installed on) the user device 102 to execute the operations associated with the system 100 by communicating one or more commands and/or instructions by way of the management port 122. Examples of the controller 124 may include, but are not limited to, an ASIC processor, a RISC processor, a CISC processor, a FPGA, and the like. Aspects of the present disclosure are intended to include or otherwise cover any type of the processing circuitry including known, related art, and/or later developed controllers and/or processing circuitries. The controller 124 may be coupled to the management port 122 and may be configured to generate a filter logic based on the user-defined set of values for the set of parameters received from the user device 102. In some aspects of the present disclosure, the controller 124 may be configured to enable the user to register for the selective unidirectional data transfer between one or more transmitter devices of the plurality of transmitter devices 104 and one or more receiver devices of the plurality of receiver devices 106. The controller 124 may further enable the user to set the password protection for logging in (or authentication of the user) in the system 100. The anode port 126 may be coupled to the plurality of transmitter devices 104, and may be configured to receive, from the plurality of transmitter devices 104, the one or more data packets and a set of values for the set of parameters corresponding to each data packet of the one or more packets. In some aspects of the present disclosure, the anode port 126 may be configured as a media-specific transceiver port. Preferably, the anode port 126 may be configured as a Small Form-factor Pluggable (SFP) port. In other aspects of the present disclosure, the anode port 126 may be configured as cither of, a wireless communication interface port and a wired communication interface port, and may enable communicative coupling between the data diode 108 and the plurality of transmitter devices 104. In some aspects of the present disclosure, the anode port 126 may be implemented on at least one of, a Field Programmable Gate Array (FPGA) and Application Specific Integrated Circuits (ASICs).

The comparator 128 may be coupled to the controller 124 and the anode port 126, and may be configured to segregate the one or more data packets into a set of valid data packets that are received at the anode port 126 from the plurality of transmitter devices 104, and a first set of invalid data packets that are received at the anode port 126 from the plurality of transmitter devices 104. In some aspects of the present disclosure, prior to the segregation of the one or more data packets, the comparator 128 may be configured to compare the set of values for the set of parameters corresponding to the one or more data packets with the user-defined set of values for the set of parameters. In some aspects of the present disclosure, the comparator 128 may be implemented on at least one of, a Field Programmable Gate Array (FPGA) and Application Specific Integrated Circuits (ASICs).

In some aspects of the present disclosure, the controller 124 may further be configured to generate a second set of invalid data packets that are received at the cathode port 130 from the plurality of receiver devices 106 (hereinafter interchangeably referred to as "second set of invalid data packets").

The cathode port 130 may be coupled to the comparator 128 and may be configured to transmit the set of valid data packets of the one or more data packets to the plurality of receiver devices 106. In some aspects of the present disclosure, the cathode port 130 may be configured as a media-specific transceiver port. Preferably, the cathode port 130 may be configured as a Small Form-factor Pluggable (SFP) port. In other aspects of the present disclosure, the cathode port 130 may be configured as either of, a wireless communication interface port and a wired communication interface port, and may enable communicative coupling between the data diode 108 and the plurality of receiver devices 106. In some aspects of the present disclosure, the cathode port 130 may be implemented on at least one of, a Field Programmable Gate Array (FPGA) and Application Specific Integrated Circuits (ASICs).

The local database 132 may be coupled to the comparator 128 and the cathode port 130, and may be configured to store the first set of invalid data packets with a first set of time-stamped invalidity logs. The local database 132 may further be configured to store the second set of invalid data packets with a second set of time-stamped invalidity logs. Furthermore, the local database 132 may be configured to store the set of valid data packets and a set of time-stamped validity logs. The local database 132 may be configured to store the logic, instructions, circuitry, interfaces, and/or codes of the controller 124 for executing various operations. The local database 132 may be further configured to store therein, data associated with user registered with the system 100. Furthermore, the local database 132 may be configured to store therein, data and/or meta-data associated with one or more of, filter logics and data packets. Aspects of the present disclosure are intended to include and/or otherwise cover any type of the data associated with the user registered with the system 100. Examples of the local database 132 may include but are not limited to, a ROM, a RAM, a flash memory, a removable storage drive, a HDD, a solid-state memory, a magnetic storage drive, a PROM, an EPROM, and/or an EEPROM. Aspects of the present disclosure are intended to include or otherwise cover any type of the local database 132 including known, related art, and/or later developed databases.

In some aspects of the present disclosure, the log generator 134 may be coupled to the comparator 128. The log generator 134 may be configured to generate the first set of time-stamped invalidity logs corresponding to the first set of invalid data packets based on the set of values for the set of parameters corresponding to each data packet of the first set of invalid data packets. The log generator 134 may further be configured to generate the second set of time-stamped invalidity logs for the second set of invalid data packets based on a second set of values for the set of parameters corresponding to each data packet of the second set of invalid data packets. Furthermore, the log generator 134 may be configured to generate a set of time-stamped validity logs based on the set of valid data packets. In some aspects of the present disclosure, the log generator 134 may be implemented on at least one of, a Field Programmable Gate Array (FPGA) and Application Specific Integrated Circuits (ASICs).

The communication network 110 may include suitable logic, circuitry, and interfaces that may be configured to provide a plurality of network ports and a plurality of communication channels for transmission and/or reception of data (in the form of data packets) between the data diode 108 and the plurality of receiver devices 106. Each network port may correspond to a virtual address (or a physical machine address) for transmission and reception of the communication data. For example, the virtual address may be an Internet Protocol Version 4 (IPV4) (or an IPV6 address) and the physical address may be a Media Access Control (MAC) address. The communication network 110 may be associated with an application layer for implementation of communication protocols based on one or more communication requests from the data diode 108 and/or the plurality of transmitter devices 106. The communication data may be transmitted or received, via the communication protocols. Examples of the communication protocols may include, but are not limited to, Hypertext Transfer Protocol (HTTP), File Transfer Protocol (FTP), Simple Mail Transfer Protocol (SMTP), Domain Network System (DNS) protocol, Common Management Interface Protocol (CMIP), Transmission Control Protocol and Internet Protocol (TCP/IP), User Datagram Protocol (UDP), Long Term Evolution (LTE) communication protocols, or any combination thereof.

In an aspect of the present disclosure, the communication data may be transmitted or received via at least one communication channel of a plurality of communication channels in the communication network 110. The communication channels may include, but are not limited to, a wireless channel, a wired channel, a combination of wireless and wired channel thereof. The wireless or wired channel may be associated with a data standard which may be defined by one of a Local Area Network (LAN), a Personal Area Network (PAN), a Wireless Local Area Network (WLAN), a Wireless Sensor Network (WSN), Wireless Area Network (WAN), Wireless Wide Area Network (WWAN), a metropolitan area network (MAN), a satellite network, the Internet, a fiber optic network, a coaxial cable network, an infrared (IR) network, a radio frequency (RF) network, and a combination thereof. Aspects of the present disclosure are intended to include or otherwise cover any type of communication channel, including known, related art, and/or later developed technologies.

Figure 2:
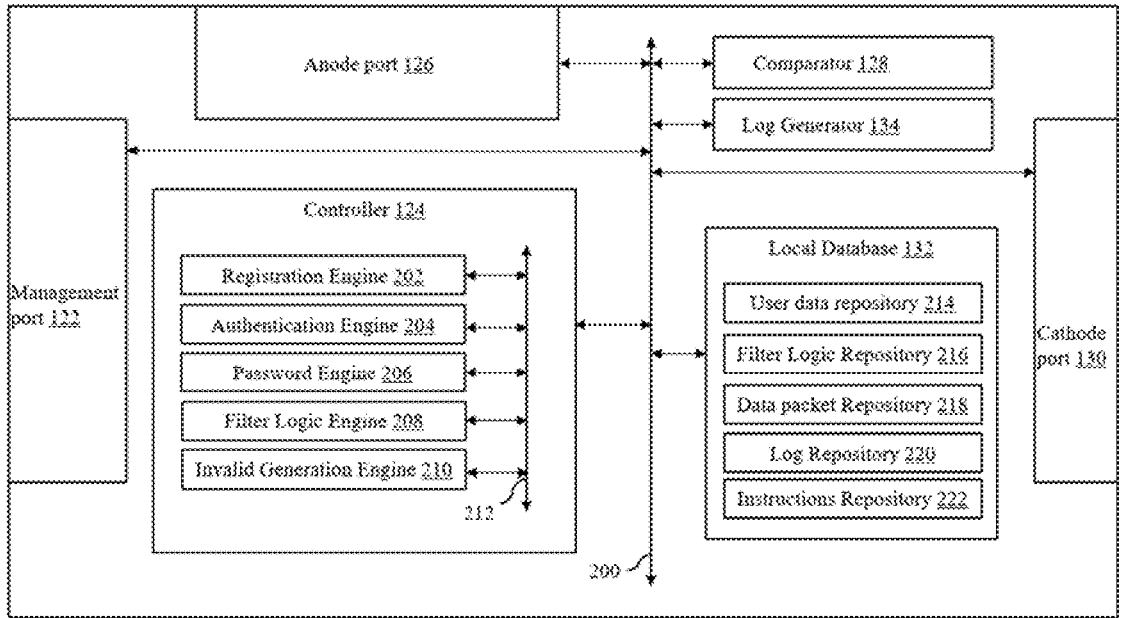
FIG. 2 illustrates a block diagram of a data diode of FIG. 1 for selective unidirectional data transfer, in accordance with an exemplary aspect of the present disclosure.

FIG. 2 illustrates a block diagram of a data diode 108 of FIG. 1 for selective unidirectional data transfer, in accordance with an exemplary aspect of the present disclosure. The data diode 108 may be configured to enable unidirectional flow of the set of valid data packets from the plurality of transmitter devices 104 to the plurality of receiver devices 106. The data diode 108 may include the management port 122, the controller 124, the anode port 126, the comparator 128, the cathode port 130, the local data base 132, and the log generator 134. In some aspects of the present disclosure, the data diode 108 may be implemented on at least one of, Field Programmable Gate Array (FPGA) and Application Specific Integrated Circuits (ASICs). In some other aspects of the present disclosure, one or more components of the data diode 108 (i.e., the management port 122, the controller 124, the anode port 126, the comparator 128, the cathode port 130, the local data base 132, and the log generator 134) may be implemented on at least one of, Field Programmable Gate Array (FPGA) and Application Specific Integrated Circuits (ASICs). In some aspects of the present disclosure, the management port 122, the controller 124, the anode port 126, the comparator 128, the cathode port 130, the local data base 132, and the log generator 134 may be communicatively coupled to each other by way of a first communication bus 200.

The management port 122 may be configured to receive the user-defined set of values for the set of parameters from the user device 102. In some aspects of the present disclosure, the management port 122 may be configured to receive the user-defined set of values for the set of parameters from the user device 102 via the first wired communication medium. Preferably, the management port 122 may be configured as the Registered Jack (RJ) port, and may be configured to receive the user-defined set of values for the set of parameters from the user device 102 via the Registered Jack-45 (RJ-45) cable. In other aspects of the present disclosure, the management port 122 may be configured to receive the user-defined set of values for the set of parameters from the user device 102 via the first wireless medium. In some aspects of the present disclosure, the management port 122 may be implemented on at least one of, Field Programmable Gate Array (FPGA) and Application Specific Integrated Circuits (ASICs).

The controller 124 may include suitable logic, instructions, circuitry, interfaces, and/or codes for executing various operations of the system 100. The controller 124 may be configured to host and enable the management console 118 running on (or installed on) the user device 102 to execute the operations associated with the system 100 by communicating one or more commands and/or instructions by way of the management port 122. Examples of the controller 124 may include, but are not limited to, an ASIC processor, a RISC processor, a CISC processor, a FPGA, and the like. Aspects of the present disclosure are intended to include or otherwise cover any type of the processing circuitry including known, related art, and/or later developed controllers and/or processing circuitries. The controller 124 may be coupled to the management port 122 and may be configured to generate the filter logic based on the user-defined set of values for the set of parameters received from the user device 102. In some aspects of the present disclosure, the controller 124 may be configured to enable the user to register for the selective unidirectional data transfer between one or more transmitter devices of the plurality of transmitter devices 104 and one or more receiver devices of the plurality of receiver devices 106. The controller 124 may further enable the user to set the password protection for logging in (or authentication of the user) in the system 100. In some aspects of the present disclosure, the controller 124 may further be configured to generate the second set of invalid data packets that are received from the plurality of receiver devices 106.

In an exemplary aspect of the present disclosure, the controller 124 may include a registration engine 202, an authentication engine 204, a password engine 206, a filter logic engine 208 and an invalid generation engine 210 communicatively coupled to each other by way of a second communication bus 212. It will be apparent to a person having ordinary skill in the art that the controller 124 is for illustrative purposes and not limited to any specific combination of hardware circuitry and software.

In some aspects of the present disclosure, the registration engine 202 may be configured to enable the user to register into the system 100 by providing registration data through a registration menu (not shown) of the management console 118 displayed through the user device 102. The registration data may include, but is not limited to, personal details of the user such as name, age, verification ID, email ID, biometric data, and the like. In some aspects of the present disclosure, the registration data may further include registration photographs of the user.

The authentication engine 204 may be configured to determine an authenticity of the user by checking a validity of the personal details of the user. In some aspects of the present disclosure, the authentication engine 204 can be configured to face match the photograph taken with a camera of the user device 102 (not shown) initially with a camera preview background snapshot. The authentication engine 204 can be configured to utilize a facial recognition and/or a face matching algorithm to match the photographs uploaded by the user. Further, the authentication engine 204 may be configured to utilize a motion verification technique such that the authentication engine 204 may generate random motions to be detected via the camera of the user device 102 (not shown) and may verify the authenticity of the user.

The password engine 206 may be configured to enable the user to set and/or generate a password for logging in the system 100 and/or authentication of the user. The password engine 206 may facilitate the user with a secure logging to provide the user-defined set of values for a set of parameters. In some aspects of the present disclosure, the password engine 206 may utilize one or more of, biometric data, numeric data, pattern data, and the like to generate and/or set the password for logging in the system 100 and/or authentication of the user.

The filter logic engine 208 may be configured to generate the filter logic based on the user-defined set of values for a set of parameters that can be used by the data diode 108 for the selective unidirectional data transfer between the plurality of transmitter nodes 104 and the plurality of receiver nodes 106.

The invalid generation engine 210 may be configured to detect one or more data packets at the cathode port 130 that may be received from the plurality of receiver nodes 106. The invalid generation engine 210 may further be configured to generate the second set of invalid data packets based on the one or more data packets at the cathode port 130 that may be received from the plurality of receiver nodes 106. In some aspects of the present disclosure, the second set of invalid data packets that may be generated by the invalid generation engine 210 may have a corresponding times-tamped invalidity log associated with each data packet of the second set of invalid data packets.

The anode port 126 may be coupled to the plurality of transmitter devices 104, and may be configured to receive, from the plurality of transmitter devices 104, the one or more data packets and the set of values for the set of parameters corresponding to each data packet of the one or more packets. In some aspects of the present disclosure, the anode port 126 may be configured as the media-specific transceiver port. Preferably, the anode port 126 may be configured as the Small Form-factor Pluggable (SFP) port. In other aspects of the present disclosure, the anode port 126 may be configured as either of, the wireless communication interface port and the wired communication interface port, and may enable communicative coupling between the data diode 108 and the plurality of transmitter devices 104. In some aspects of the present disclosure, the anode port 126 may be implemented on at least one of, Field Programmable Gate Array (FPGA) and Application Specific Integrated Circuits (ASICs).

The comparator 128 may be coupled to the controller 124 and the anode port 126, and may be configured to segregate the one or more data packets into the set of valid data packets and the first set of invalid data packets. In some aspects of the present disclosure, prior to the segregation of the one or more data packets, the comparator 128 may be configured to compare the set of values for the set of parameters corresponding to the one or more data packets with the user-defined set of values for the set of parameters. In some aspects of the present disclosure, the comparator 128 may be implemented on at least one of, a Field Programmable Gate Array (FPGA) and Application Specific Integrated Circuits (ASICs).

The cathode port 130 may be coupled to the comparator 128 and may be configured to transmit the set of valid data packets of the one or more data packets to the plurality of receiver devices 106. In some aspects of the present disclosure, the cathode port 130 may be configured as a media-specific transceiver port. Preferably, the cathode port 130 may be configured as a Small Form-factor Pluggable (SFP) port. In other aspects of the present disclosure, the cathode port 130 may be configured as either of, the wireless communication interface port and the wired communication interface port, and may enable communicative coupling between the data diode 108 and the plurality of receiver devices 106. In some aspects of the present disclosure, the cathode port 130 may be implemented on at least one of, Field Programmable Gate Array (FPGA) and Application Specific Integrated Circuits (ASICs).

The local database 132 may be coupled to the comparator 128 and the cathode port 130, and may be configured to store the first set of invalid data packets with the first set of time-stamped invalidity logs. The local database 132 may further be configured to store the second set of invalid data packets with the second set of time-stamped invalidity logs. Furthermore, the local database 132 may be configured to store the set of valid data packets and a set of time-stamped validity logs. The local database 132 may be configured to store the logic, instructions, circuitry, interfaces, and/or codes of the controller 124 for executing various operations. The local database 132 may be further configured to store therein, data associated with user registered with the system 100. Furthermore, the local database 132 may be configured to store therein, data and/or meta-data associated with one or more of, filter logics and data packets. Aspects of the present disclosure are intended to include and/or otherwise cover any type of the data associated with the user registered with the system 100. Examples of the local database 132 may include but are not limited to, a ROM, a RAM, a flash memory, a removable storage drive, a HDD, a solid-state memory, a magnetic storage drive, a PROM, an EPROM, and/or an EEPROM. Aspects of the present disclosure are intended to include or otherwise cover any type of the local database 132 including known, related art, and/or later developed databases.

In an exemplary aspect of the present disclosure, the local database 132 may include a user data repository 214, a filter logic repository 216, a data packet repository 218, a log repository 220, and an instructions repository 222. The user data repository may be configured to store data associated with user registered with the system 100, such as but not limited to registration data, authentication data, biometric data, and the like. The filter logic repository 218 may be configured to store one or more filter logics generated by the filter logic engine 208 based on the user-defined set of values for the set of parameters. The data packet repository 218 may be configured to store the set of valid data packets, the first set of invalid data packets, and the second set of invalid data packets. The log repository 220 may be configured to store the set of time-stamped validity logs, the first set of time-stamped invalidity logs, and the second set of time-stamped invalidity logs. The instructions repository 222 may be configured to store the logic, instructions, circuitry, interfaces, and/or codes of the controller 124 for executing various operations. In some other aspects of the present disclosure, the local database 132 may be configured as a single repository (not shown) and may be configured to store the data of the system 100 as mentioned hereinabove.

In some aspects of the present disclosure, the log generator 134 may be coupled to the comparator 128. The log generator 134 may be configured to generate the first set of time-stamped invalidity logs corresponding to the first set of invalid data packets based on the set of values for the set of parameters corresponding to each data packet of the first set of invalid data packets. In some aspects of the present disclosure, the log generator 134 may be configured to initially generate a first set of invalidity logs and further may be configured to mark time-stamps on the first set of invalidity logs based on a time of reception of the first set of invalid data packets to generate the first set of time-stamped invalidity logs. The log generator 134 may further be configured to generate the second set of time-stamped invalidity logs for the second set of invalid data packets based on a second set of values for the set of parameters corresponding to each data packet of the second set of invalid data packets. In some aspects of the present disclosure, the log generator 134 may be configured to initially generate a second set of invalidity logs and further may be configured to mark time-stamps on the second set of invalidity logs based on a time of reception of the second set of invalid data packets to generate the first set of time-stamped invalidity logs. Furthermore, the log generator 134 may be configured to generate the set of time-stamped validity logs based on the set of valid data packets. In some aspects of the present disclosure, the log generator 134 may be configured to initially generate a set of validity logs and further may be configured to mark time-stamps on the set of validity logs based on a time of reception of the set of valid data packets to generate the set of time-stamped validity logs. In some aspects of the present disclosure, the log generator 134 may be implemented on at least one of, a Field Programmable Gate Array (FPGA) and Application Specific Integrated Circuits (ASICs).

FIG. 3 illustrates a flow chart of a method 300 for the selective unidirectional data transfer, in accordance with an exemplary aspect of the present disclosure.

At step 302, the system 100, by way of a management port 122 of the data diode 108, may receive the user-defined set of values for the set of parameters from the user device 102. In some aspects of the present disclosure, the system 100, by way of the user device 102 may facilitate the user to input the user-defined set of values for the set of parameters from a user device.

At step 304, the system 100, by way of the controller 124 of the data diode 108, may generate the filter logic based on the user-defined set of values for the set of parameters received from the user device 102. In some aspects of the present disclosure, the system 100 may use the user-defined set of values for the set of parameters for the selective unidirectional data transfer from the plurality of transmitter nodes 104 to the plurality of receiver nodes 106.

At step 306, the system 100, by way of the anode port of the data diode 126, may receive the one or more data packets and the first set of values for the set of parameters corresponding to each data packet of the one or more data packets from the plurality of transmitter devices 104.

At step 308, the system 100, by way of the comparator 128 of the data diode 128, may compare the first set of values for the set of parameters corresponding to each data packet of the one or more data packets with the user-defined set of values for the set of parameters.

At step 310, the system 100, by way of the comparator 128 of the data diode 108, may segregate the one or more data packets into the set of valid data packets and the first set of invalid data packets.

At step 312, the system 100, by way of the cathode port 130 of the data diode 108, may transmit unidirectionally the set of valid packets of the one or more data packets to the plurality of receiver devices 106.

At step 314, the system 100, by way of a log generator 134 of the data diode 108, may generate the first set of time-stamped invalidity logs corresponding to the first set of invalid data packets based on the first set of values for the set of parameters corresponding to each data packet of the first set of invalid data packets.

At step 316, the system 100, by way of the local database 132 of the data diode 108, may store the first set of invalid data packets with the first set of time-stamped invalidity logs.

At step 318, the system 100, by way of the controller 124 of the data diode 108, may generate the second set of invalid data packets that may be received from the plurality of receiver devices 106.

At step 320, the system 100, by way of the log generator 134, may generate the second set of time-stamped invalidity logs for the second set of invalid data packets based on the second set of values for the set of parameters corresponding to each data packet of the second set of invalid data packets.

At step 322, the system 100, by way of the local database 132, may store the second set of invalid data packets with the second set of time-stamped invalidity logs.

As mentioned, there remains a need for a system, a method, and a device capable of secure data transfer between a selective set of nodes. The present aspect, therefore: provides the system 100, the method 300, and the data diode 108 for secure and selective unidirectional data transfer from the plurality of transmitter devices 104 to the plurality of receiver devices 106. The system 100 by way of the user-defined set of values of the set of parameters and the filter logic generated by the data diode 108 may further enable a selective filtering of the unidirectional data flow from the plurality of transmitter devices 104 to the plurality of receiver devices 106. The system 100 by way of the log generator 134 of the data diode 108 may further provide data logs (i.e., the set of time-stamped validity logs and the first set of time-stamped invalidity logs) of the one or more data packets received from the plurality of transmitter devices 104 and the data logs (i.e., the second set of time-stamped invalidity logs) of the one or more data packets received from the plurality of receiver devices 106.

The foregoing discussion of the present disclosure has been presented for purposes of illustration and description. It is not intended to limit the present disclosure to the form or forms disclosed herein. In the foregoing Detailed Description, for example, various features of the present disclosure are grouped together in one or more aspects, configurations, or aspects for the purpose of streamlining the disclosure. The features of the aspects, configurations, or aspects may be combined in alternate aspects, configurations, or aspects other than those discussed above. This method of disclosure is not to be interpreted as reflecting an intention the present disclosure requires more features than are expressly recited in each claim. Rather, as the following claims reflect, inventive aspects lie in less than all features of a single foregoing disclosed aspect, configuration, or aspect. Thus, the following claims are hereby incorporated into this Detailed Description, with each claim standing on its own as a separate aspect of the present disclosure.

Moreover, though the description of the present disclosure has included description of one or more aspects, configurations, or aspects and certain variations and modifications, other variations, combinations, and modifications are within the scope of the present disclosure, e.g., as may be within the skill and knowledge of those in the art, after understanding the present disclosure. It is intended to obtain rights which include alternative aspects, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

As one skilled in the art will appreciate, the system 100 includes a number of functional blocks in the form of a number of units and/or engines. The functionality of each unit and/or engine goes beyond merely finding one or more computer algorithms to carry out one or more procedures and/or methods in the form of a predefined sequential manner, rather each engine explores adding up and/or obtaining one or more objectives contributing to an overall functionality of the system 100. Each unit and/or engine may not be limited to an algorithmic and/or coded form, rather may be implemented by way of one or more hardware elements operating together to achieve one or more objectives contributing to the overall functionality of the system 100. Further, as it will be readily apparent to those skilled in the art, all the steps, methods and/or procedures of the system 100 are generic and procedural in nature and are not specific and sequential.

Certain terms are used throughout the following description and claims to refer to particular features or components. As one skilled in the art will appreciate, different persons may refer to the same feature or component by different names. This document does not intend to distinguish between components or features that differ in name but not structure or function. While various aspects of the present disclosure have been illustrated and described, it will be clear that the present disclosure is not limited to these aspects only. Numerous modifications, changes, variations, substitutions, and equivalents will be apparent to those skilled in the art, without departing from the spirit and scope of the present disclosure, as described in the claims.

What is claimed:

1. A data diode (108) comprising:

a management port (122) configured to receive a user-defined set of values for a set of parameters from a user device (102);

a controller (124) that is coupled to the management port (122) and configured to generate a filter logic based on the user-defined set of values for the set of parameters received from the user device (102);

an anode port (126) that is coupled to a plurality of transmitter devices (104) and configured to receive, from the plurality of transmitter devices (104), one or more data packets and a set of values for the set of parameters corresponding to each data packet of the one or more packets;

a comparator (128) that is coupled to the controller (124) and the anode port (126), and configured to segregate the one or more data packets into a set of valid data packets and a first set of invalid data packets;

a cathode port (130) that is coupled to the comparator (128) and configured to transmit the set of valid data packets of the one or more data packets to a plurality of receiver devices (106); and a local database (132) that is coupled to the comparator (128) and the cathode port (130), and configured to store the first set of invalid data packets with a first set of time-stamped invalidity logs;

wherein the data diode (108) is configured to enable unidirectional flow of the set of valid data packets from the plurality of transmitter devices (104) to the plurality of receiver devices (106).

2. The data diode (108) as claimed in claim 1, wherein, prior to the segregation of the one or more data packets, the comparator (128) is configured to compare the set of values for the set of parameters corresponding to the one or more data packets with the user-defined set of values for the set of parameters.

3. The data diode (108) as claimed in claim 1, wherein the controller (124) is further configured to generate a second set of invalid data packets that are received from the plurality of receiver devices (106).

4. The data diode (108) as claimed in claim 3, further comprising a log generator (134) that is coupled to the comparator (128) and configured to (i) generate a first set of time-stamped invalidity logs corresponding to the first set of invalid data packets based on the set of values for the set of parameters corresponding to each data packet of the first set of invalid data packets and (ii) generate a second set of time-stamped invalidity logs for the second set of invalid data packets based on a second set of values for the set of parameters corresponding to each data packet of the second set of invalid data packets.

5. A system (100) comprising:

a user device (102), a plurality of transmitter devices (104), a plurality of receiver devices (106), and a data diode (108) that is coupled to the user device (102), the plurality of transmitter devices (104), and the plurality of receiver devices (106), the data diode (108) comprising:

a management port (122) configured to receive a user-defined set of values for a set of parameters from the user device (102);

a controller (124) that is coupled to the management port (122) and configured to generate a filter logic based on the user-defined set of values for the set of parameters received from the user device (102);

an anode port (126) that is coupled to the plurality of transmitter devices (104) and configured to receive, from the plurality of transmitter devices (104), one or more data packets and a set of values for the set of parameters corresponding to each data packet of the one or more packets;

a comparator (128) that is coupled to the controller (124) and the anode port (126), and configured to segregate the one or more data packets into a set of valid data packets and a first set of invalid data packets;

a cathode port (130) that is coupled to the comparator (128) and configured to transmit the set of valid data packets of the one or more data packets to the plurality of receiver devices (106); and a local database (132) that is coupled to the comparator (128) and the cathode port (130), and configured to store the first set of invalid data packets with a first set of time-stamped invalidity logs;

wherein the data diode (108) is configured to enable unidirectional flow of the set of valid data packets from the plurality of transmitter devices (104) to the plurality of receiver devices (106).

6. The system (100) as claimed in claim 5, wherein, prior to the segregation of the one or more data packets, the comparator (128) is configured to compare the set of values for the set of parameters corresponding to the one or more data packets with the user-defined set of values for the set of parameters.

7. The system (100) as claimed in claim 5, wherein the controller (124) is further configured to generate a second set of invalid data packets that are received from the plurality of receiver devices (106).

8. The system (100) as claimed in claim 7, wherein the data diode (108) further comprising a log generator (134) that is coupled to the comparator (128) and configured to (i) generate a first set of time-stamped invalidity logs corresponding to the first set of invalid data packets based on the set of values for the set of parameters corresponding to each data packet of the first set of invalid data packets and (ii) generate a second set of time-stamped invalidity logs for the second set of invalid data packets based on a second set of values for the set of parameters corresponding to each data packet of the second set of invalid data packets.

9. A method (300) comprising:

receiving, by way of a management port (122) of a data diode (108), a user-defined set of values for a set of parameters from a user device (102);

generating, by way of a controller (124) of the data diode (108), a filter logic based on the user-defined set of values for the set of parameters received from a user device (102);

receiving, by way of an anode port (126) of the data diode (108), from a plurality of transmitter devices (104), one or more data packets and a first set of values for the set of parameters corresponding to each data packet of the one or more data packets;

segregating, by way of a comparator (128) of the data diode (108), the one or more data packets into a set of valid data packets and a first set of invalid data packets;

transmitting unidirectionally, by way of a cathode port (130) of the data diode (108), the set of valid data packets of the one or more data packets to a plurality of receiver devices (106); and storing, by way of a local database (132) of the data diode (108), the first set of invalid data packets with a first set of time-stamped invalidity logs.

10. The method (300) as claimed in claim 9, wherein, prior to segregating the one or more data packets, the method (300) comprising comparing, by way of the comparator (128), the first set of values for the set of parameters corresponding to each data packet of the one or more data packets with the user-defined set of values for the set of parameters.

11. The method (300) as claimed in claim 9, wherein, prior to storing the first set of invalid data packets with the first set of time-stamped invalidity logs, the method (300) comprising generating, by way of a log generator (134) of the data diode, a first set of time-stamped invalidity logs corresponding to the first set of invalid data packets based on the first set of values for the set of parameters corresponding to each data packet of the first set of invalid data packets.

12. The method (300) as claimed in claim 9, wherein the method (300) further comprising (i) generating, by way of the controller (124) of the data diode (108), a second set of invalid data packets that are received from the plurality of receiver devices (106), (ii) generating, by way of the log generator (134), a second set of time-stamped invalidity logs for the second set of invalid data packets based on a second set of values for the set of parameters corresponding to each data packet of the second set of invalid data packets, and (iii) storing, by way of the local database (132), the second set of invalid data packets with the second set of time-stamped invalidity logs.

* * * * *